United States Patent

Bloomberg et al.

Patent Number: 5,562,320
Date of Patent: Oct. 8, 1996

[54] GRIPPER HEAD

[75] Inventors: Jeffrey A. Bloomberg, Hopewell Junction; Peter O. Johnson, Tivoli; James A. Landor, Poughkeepsie; Matthew W. Naughton, Beacon; Tracy A. Tong, Pleasant Valley, all of N.Y.

[73] Assignee: International Business Machines Corporation, Armonk, N.Y.

[21] Appl. No.: 334,668

[22] Filed: Nov. 4, 1994

[51] Int. Cl.$^6$ ..................................... B25J 15/08
[52] U.S. Cl. ..................... 294/119.1; 294/88; 294/902; 901/37
[58] Field of Search .................... 294/2, 88, 106, 294/115, 119.1, 902; 901/37, 39; 29/739–741

[56] References Cited

U.S. PATENT DOCUMENTS

| | | | |
|---|---|---|---|
| 3,139,302 | 6/1964 | Orloff et al. | 294/88 |
| 3,199,910 | 8/1965 | Bradley | 294/119.1 |
| 4,042,122 | 8/1977 | Espy et al. | 214/1 |
| 4,273,506 | 6/1981 | Thomson et al. | 414/735 |
| 4,403,801 | 9/1983 | Huff et al. | 901/39 |
| 4,611,846 | 9/1986 | Feiber et al. | 294/88 |
| 4,653,794 | 3/1987 | Atlas | 294/88 |
| 4,789,292 | 12/1988 | Holcomb | 414/226 |
| 4,861,087 | 8/1989 | Park | 294/119 |
| 4,910,859 | 3/1990 | Holcomb | 29/564.2 |
| 5,050,919 | 9/1991 | Yakou | 294/119.1 |
| 5,127,695 | 7/1992 | Zoeten | 294/119.1 |
| 5,163,729 | 11/1992 | Borcea et al. | 901/37 |

FOREIGN PATENT DOCUMENTS 1175-690  8/1985  U.S.S.R. .................. 294/902

OTHER PUBLICATIONS

IBM Technical Disclosure Bulletin, vol. 28, No. 2, Jul. 1985, "Robot–Integrated Circuit Inserter", by Sorokac et al.
IBM Technical Disclosure Bulletin, vol. 30, No. 7, Dec. 1987, "Servo–Controlled Robot Gripper", by Smith.
IBM Technical Disclosure Bulletin, vol. 32, No. 6B, Nov. 1989, "Mechanical Gripper for Handling Ceramic Substrates and Trays", by Bird et al.

*Primary Examiner*—Dean Kramer
*Attorney, Agent, or Firm*—DeLio & Peterson; Raymond A. Nuzzo; Aziz M. Ahsan

[57] ABSTRACT

A gripping apparatus comprising a body having a fastener for attaching the body to an automated manufacturing device, a pair of jaws slidably attached to the body, each jaw projecting away from the body, a jaw driver for opening and closing the jaws, the movement of each jaw defining one range of motion, a pair of fingers, each of which extending from and movably attached to a corresponding jaw, and a finger driver connected to open and close the fingers, the movement of each finger defining another range of motion, one range of motion being significantly smaller than the other range of motion, the movement of the fingers being independent of the movement of the jaws.

36 Claims, 4 Drawing Sheets

FIG. 5 ns, and positioning and releasing them at predetermined locations.

GRIPPER HEAD

BACKGROUND OF THE INVENTION

1. Field of the Invention

The present invention relates to a gripping device for use in locating and gripping objects, and positioning and releasing them at predetermined locations.

2. Problem to be Solved i) Background and Long Felt-Need

Typically, robotic or automated assemblies utilize gripper heads (end effectors) such as the type disclosed in U.S. Pat. No. 4,611,846. The gripper head is used to retrieve components, such as electronic components, and position them at predetermined locations, such as a specific location on a printed circuit card or board. Typically, conventional gripper heads utilize jaws that open and close to predetermined positions. This enables the gripper head jaws to handle components or parts of various sizes. Typically, conventional gripper jaws open to their fullest extent to retrieve large-sized components. However, it has been found that the wide range of motion of the gripper jaws can cause damage to or interfere with adjacent components on the circuit card or board. Damage to or interference with adjacent components is especially prevalent when inserting components on a high density printed circuit card. What is needed is a gripper head that can retrieve components, position and release them at predetermined locations without interfering with adjacent components, and which is lightweight. An additional requirement is that the gripper head must be of a design which facilitates manufacture thereof so as to reduce manufacturing costs. Furthermore, it is also essential that the gripper head have the durability to withstand environments that require between about 7 and 8 millions cycles per year.

ii) Failure of Others

One attempt at solving the aforementioned problems is a gripper that utilizes complex spring arrangements to limit the travel of the gripper jaws. However, such a gripper is complex in design and expensive to manufacture. Another attempt to solve the aforementioned problems is the gripper head of U.S. Pat. No. 4,611,846 which utilizes braking and tamping mechanisms. However, this design is also complex and expensive to manufacture. A further attempt is found in U.S. Pat. No. 4,653,794 which discloses a gripper that utilizes a locking or brake cylinder in cooperation with a yoke and long and short stroke cylinders to open and close a pair of gripper fingers through a relatively long or short stroke, respectively. However, the utilization of the long, short and braking cylinders and the yoke significantly adds to the weight of the gripper, and significantly degrades the speed and accuracy of the robot arm to which the gripper is attached. Furthermore, the utilization of the aforementioned cylinders results in a design that is complex and expensive to manufacture.

iii) Purposes of the Present Invention

Bearing in mind the problems and inefficiencies of conventional gripper heads, it is a purpose of the present invention to provide a new and improved gripper head that can retrieve components and position them at predetermined locations without interfering with adjacent components, and which is lightweight.

It is another purpose of the present invention to provide a new and improved gripper head that has sufficient durability to withstand environments that require more than 7 million cycles per year.

It is another purpose of the present invention to provide a new and improved gripper head that can be manufactured at reasonable costs.

It is a further purpose of the present invention to provide a method for retrieving components and positioning them at predetermined locations without interfering with adjacent components.

SUMMARY OF THE INVENTION

The above and other purposes, which will be apparent to one of skill in the art, are achieved in the present invention which is directed to, in a first aspect, to a gripper head for retrieving components and placing them in a predetermined position, comprising a body having a fastener for attaching the body to an automated manufacturing device, a pair of jaws slidably or movably attached to the body, each jaw projecting away from the body, a jaw driver operatively attached to the body for opening and closing the jaws, the movement of each jaw defining one range of motion, a pair of fingers, each of which extending from and movably attached to a corresponding jaw, and a finger driver connected to open and close the fingers independently of the jaws, the movement of each finger defining another range of motion, one of the ranges of motion being significantly smaller than the other range of motion.

In a related aspect, the present invention relates to a gripper head for retrieving components and transferring them to a predetermined position, comprising a body having a top portion, a bottom portion and a fastener attached to the top portion for attaching the body to an automated device, the body having a vertically oriented central axis, a pair of jaws slidably attached to the bottom portion of the body, one positioned on each side of the central axis, each jaw projecting away from the body and defining a chamber, the axis of each jaw being substantially parallel to the central axis, a first pair of drivers disposed within the body for bidirectionally driving a corresponding jaw toward and away from the central axis, the bidirectional movement of each jaw defining a first range of motion, a pair of fingers, each of which being partially and movably disposed within a corresponding chamber, and a second pair of drivers, each of which being operatively attached to a corresponding one of the jaws for bidirectionally driving a corresponding finger toward and away from the central axis, the bidirectional movement of each finger defining a second range of motion significantly smaller than the first range of motion and being independent of the bidirectional movement of the jaws.

In another aspect, the present invention relates to a body having a top portion, a bottom portion and a fastener attached to the top portion for attaching the body to an automated device, the body having a vertically oriented central axis, a pair of jaws slidably attached to the bottom portion of the body, one positioned on each side of the central axis, each jaw projecting away from the body and defining a chamber, the axis of each jaw being substantially parallel to the central axis, a first pair of drivers disposed within the body for bidirectionally driving a corresponding jaw toward and away from the central axis, the bidirectional movement of each jaw defining a first range of motion, a pair of fingers, each of which being partially and movably disposed within a corresponding chamber, and a second pair of drivers, each of which being operatively attached to a corresponding one of the jaws for bidirectionally driving a corresponding finger toward and away from the central axis, the bidirectional movement of each finger defining a second range of motion significantly larger than the first range of motion, the bidirectional movement of the jaws being independent of the bidirectional movement of the fingers.

In a further aspect, the present invention is directed to a method for retrieving components and placing them at a predetermined location, comprising the steps of: (a) providing a gripping apparatus, the apparatus comprising a body having a fastener for attaching the body to a robotic controller, a pair of jaws slidably attached to the body and projecting away from the body, a jaw driver operatively attached to the body for opening and closing the jaws, the movement of each jaw defining a first range of motion, a pair of fingers, each of which extending from and movably attached to a corresponding jaw, and a finger driver connected to open and close the fingers, the bidirectional movement of each finger defining a second range of motion significantly smaller than the first range of motion, the movement of the fingers being independent from the movement of the jaws; (b) opening the jaws, (c) closing the fingers, (d) positioning the gripping apparatus so that a component to be retrieved is between the fingers, (e) closing the jaws so the fingers grip the component, (f) positioning the gripping apparatus so that the component is at the predetermined location, (g) neutralizing the jaws and (h) opening the fingers to release the grip on the component.

In another aspect, the present invention is related to a method for retrieving components and placing them at a predetermined location without interfering with adjacent components, comprising the steps of: (a) providing a gripping apparatus, the apparatus comprising a body having a fastener for attaching the body to a robotic controller, a pair of jaws slidably attached to the body and projecting away from the body, a jaw driver operatively attached to the body for opening and closing the jaws, the movement of each jaw defining a first range of motion, a pair of fingers, each of which extending from and movably attached to a corresponding jaw, and a finger driver connected to open and close the fingers, the bidirectional movement of each finger defining second range of motion significantly larger than the first range of motion, the movement of the jaws being independent from the movement of the fingers, (b) closing the jaws, (c) opening the fingers, (d) positioning the gripping apparatus so that a component to be retrieved is between the fingers, (e) closing the fingers to grip the component, (f) positioning the gripping apparatus so that the component is at the predetermined location, (g) neutralizing the fingers, and (h) opening the jaws to release the grip on the component.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiment of the present invention, reference will be made herein to FIGS. 1–5 of the drawings in which like numerals refer to like features of the invention. Features of the invention are not necessarily shown to scale in the drawings.

Figure 1:
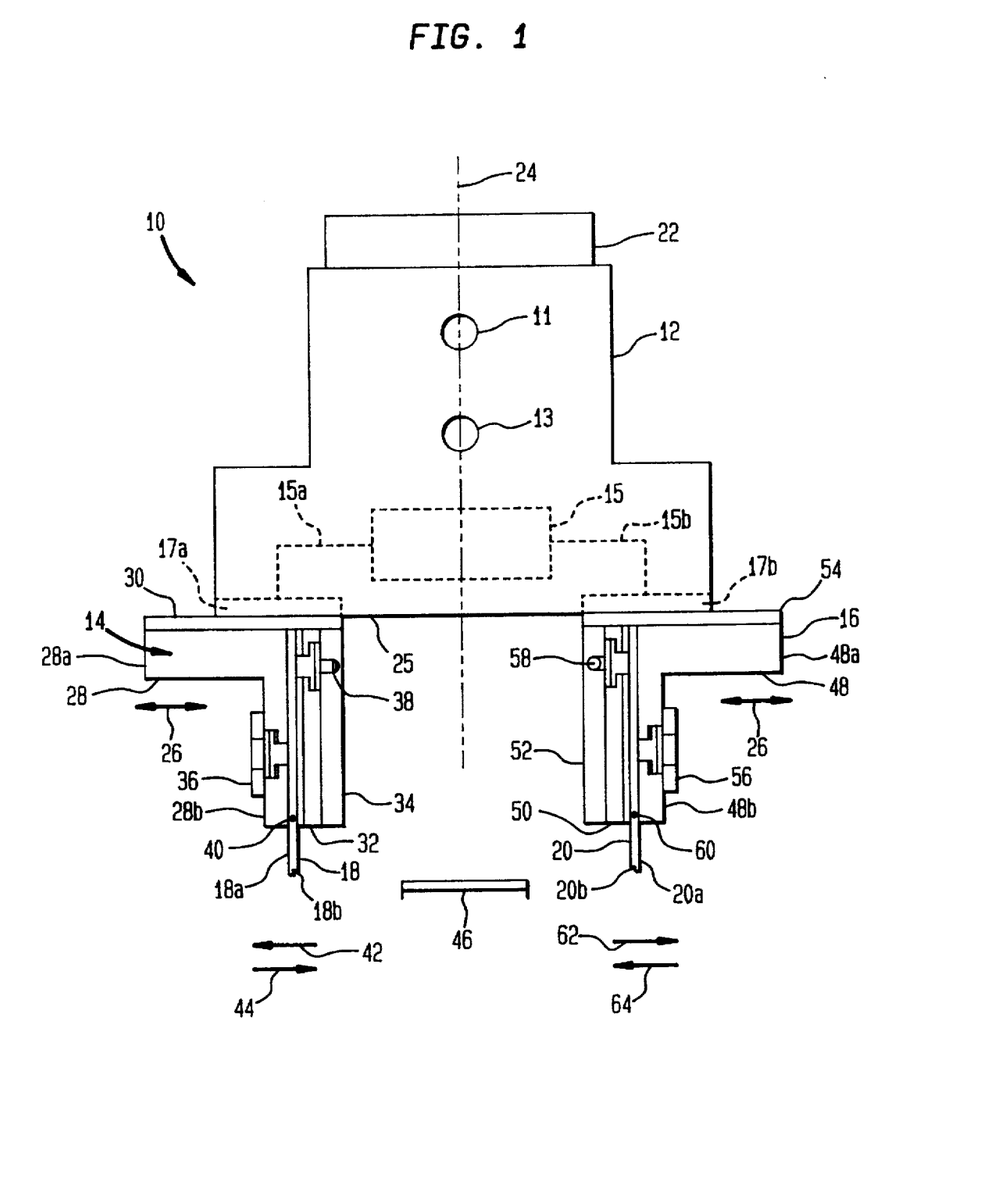
FIG. 1 is front elevational view of the gripper head of the present invention wherein the gripper jaws are in an open position and the gripper fingers are in a closed position.

Referring to FIG. 1, gripper 10 of the present invention generally consists of body 12, jaws 14 and 16 and gripper fingers 18 and 20. Body 12 is removably attached to a robot (not shown) via flange 22. Such a robot is described in U.S. Pat. No. 4,611,846, the disclosure of which is incorporated herein by reference. The preferred gripper body 12 is available from Phd. Inc. of Fort Wayne, Ind., and ROBOHAND INC. of Monroe, Conn.

Jaws 14 and 16 are slidably attached to the bottom portion 25 of body 12. Jaws 14 and 16 are positioned opposite one another and on opposite sides of central axis 24. Each jaw 14, 16 projects away from body 12 wherein the axis of each jaw 14, 16 is substantially parallel to central axis 24. Body 12 houses therein a pneumatic driver 15 for bidirectionally driving each jaw, via connections 15a and 15b, toward and away from axis 24 as indicated by arrows 26 in order to open and close jaws 14 and 16. Driver 15 is configured in a manner such that the movement of jaws 14 and 16 is symmetric and simultaneous. In an alternate embodiment, driver 15 comprises a pair of drivers diametrically positioned in a manner such that one driver is on each side of central axis 24. Preferably, driver 15 is pneumatic and is of a piston-fulcrum configuration. However, driver 15 can also be a servo-type driver, an electromagnetic type driver or a position-sensing driver. Furthermore, driver 15 may also be a hydraulic driver. Additionally, driver 15 may also be operatively attached to the exterior of body 12.

Jaw 14 is comprised of substantially L-shaped section 28, support member 30, plates 32 and 34. L-shaped section 28 is comprised of portions 28a and 28b. Section 28 is removably attached to support member 30 at portion 28a. Support member 30 is slidably and partially disposed within groove 17a within body 12 and is operatively engaged with driver 15 via connection 15a. In a preferred embodiment, portion 28a is attached to member 30 via allen-type screws. Plate 32 is attached to portion 28b of L-shaped section 28. Plate 32 and portion 28b define a chamber therebetween which extends substantially the entire length of plate 32. Finger 18 is pivotally and removably mounted within this chamber and will be discussed in greater detail below.

Portion 28b has an opening therein which is coupled to air inlet valve 36 which is mounted thereon and is in communication with the chamber between portion 28b and plate 32. Plate 34 is attached to plate 32 and has an opening therein in communication with the chamber between portion 28b and plate 32. The opening in plate 34 is coupled to air inlet valve 38.

Finger 18 is pivotally and removably disposed within the chamber between portion 28b and plate 32 via pivot pin 40. Finger 18 pivots in accordance with pressurized air flow through valves 36 and 38. Either valve 36 or 38 will be receiving pressurized air flow from pressurized air source 80. Thus, when one valve is receiving pressurized air, the other is not. When air inlet valve 36 receives pressurized air, tip 18a of finger 18 moves in the direction indicated by arrow 42. When air inlet valve 38 receives pressurized air, tip 18a moves in the direction indicated by arrow 44. Stepped edge 18b of finger tip 18a receives the perimetrical edge of component 46. Stepped edge 18b can also grip the component leads to facilitate positioning the component at the desired location. Since finger 18 is removably positioned within the chamber, finger 18 can be replaced if it becomes damaged or worn.

Jaw 16 is comprised of substantially L-shaped section 48, plates 50, plate 52, and support member 54. L-shaped section 48 is comprised of portions 48a and 48b. Section 48 is removably attached to member 54 at portion 48a. Member 54 is slidably and partially disposed within groove 17b within body 12 and is operatively engaged with driver 15 via connection 15b. In a preferred embodiment, portion 48a is attached to member 54 via allen-type screws. Plate 50 is attached to portion 48b of L-shaped section 48. Plate 50 and portion 48b define a chamber therebetween which extends substantially the entire length of plate 50. Finger 20 is pivotally and removably mounted within this chamber and will be discussed in greater detail below.

Portion 48b has an opening therein which is coupled to air inlet valve 56 which is mounted on portion 48b. Air inlet valve 56 is in communication with the chamber between portion 48b and plate 50. Plate 52 is attached to plate 50 and has an opening therein in communication with the chamber between portion 48b and plate 50. The opening in plate 52 is coupled to air inlet valve 58.

Finger 20 is pivotally and removably disposed within the chamber between portion 48b and plate 50 via pivot pin 60. Finger 20 pivots in accordance with pressurized air flow through valves 56 and 58. Either valve 56 or 58 will be receiving pressurized air flow from air pressurized air source 80. Thus, when one valve is receiving pressurized air, the other is not. When air inlet valve 56 receives pressurized air, tip 20a of finger 20 moves in the direction indicated by arrow 62. When air inlet valve 58 receives pressurized air, tip 20a moves in the direction indicated by arrow 64. Stepped edge 20b of finger 20 receives the perimetrical edge of component 46. Stepped edge 20b can also grip the component leads to facilitate positioning the component at the desired location.

Finger tips 18a and 20a are in the open position when moved to the fullest extent in the direction indicated by arrows 42 and 62, respectively. This occurs when pressurized air is applied to air inlet valves 36 and 56 simultaneously. Finger tips 18a and 20a are in the closed position when moved to the fullest extent in the direction indicated by arrows 44 and 64, respectively. This occurs when pressurized air is applied to air inlet valves 38 and 58 simultaneously. During operation of gripper 10 of the present invention, movement of finger tips 18a and 20a is symmetric and simultaneous. In a preferred embodiment, sections 28, 48, members 30, 54, plates 32, 34, 52, 54 and fingers 18, 20 are fabricated from a material which is wear resistant, lightweight and preferably corrosion resistant. Although in a preferred embodiment, fingers 18 and 20 are pneumatically driven, servo-type drivers, electromagnetic-type drivers or position-sensing drivers may also be used to drive fingers 18 and 20.

Figure 3:
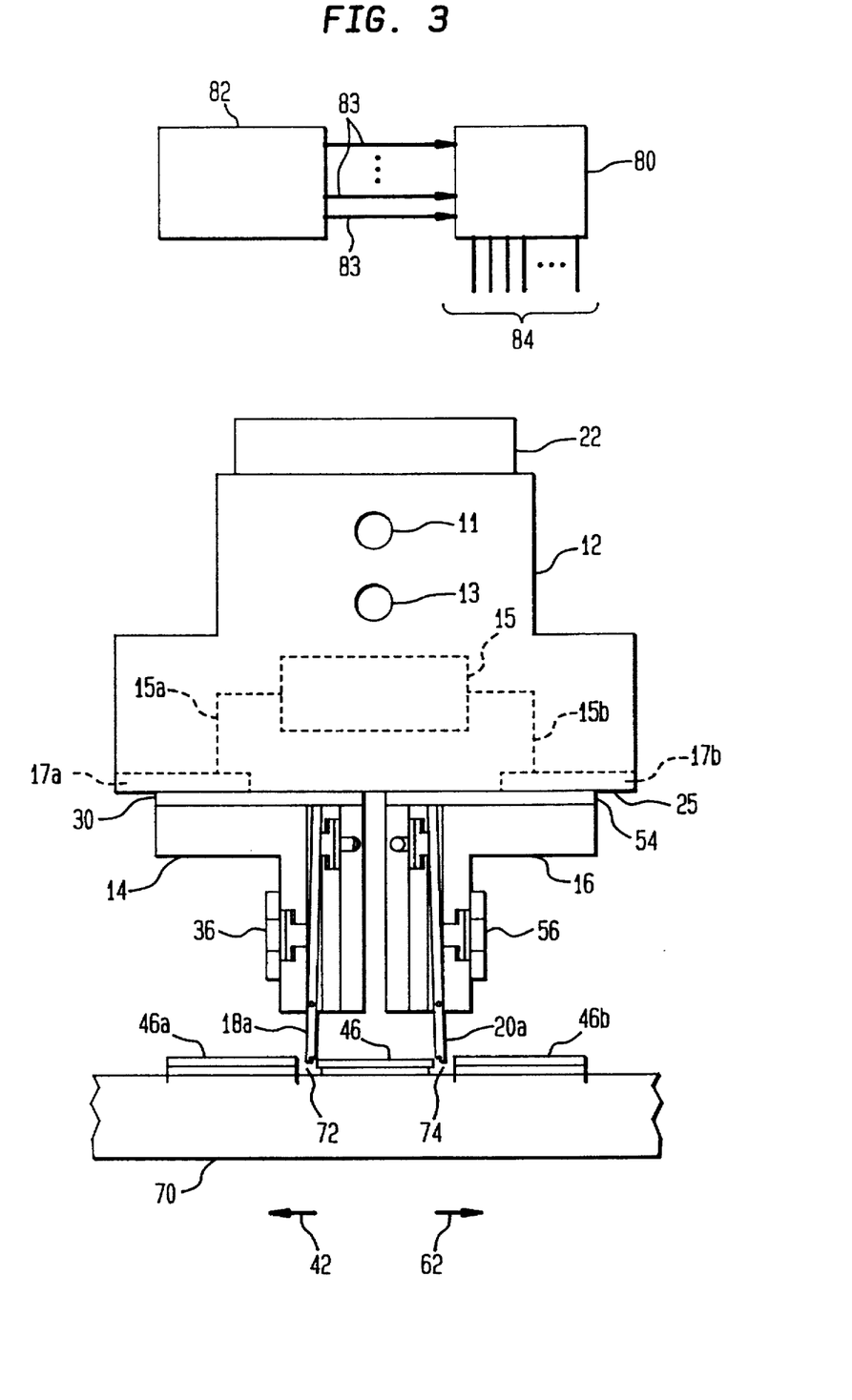
FIG. 3 shows the gripper head of FIG. 1 wherein the gripper jaws are neutralized in the closed position and the gripper fingers are in the open position so as to release the component.

If pneumatic drivers are utilized, then air inlet valves 11, 13, 36, 38, 56 and 58 are coupled to a pressurized air source 80 (see FIG. 3). Referring to FIG. 3, pressurized air source 80 is preferably connected, via cables 83, to a controller 82 which controls the air flow through the air conduits or cables 84 that are coupled to the aforementioned air inlet valves. Such a configuration is suitable to automated or robotic manufacturing or assembly processes. Unless pressurized air is applied to air inlet valves 11 or 13, jaws 14 and 16 will remain stationary. When pressurized air is applied to inlet 11, jaws 14 and 16 move to the open position. When pressurized air is applied to air inlet 13, jaws 14 and 16 move to the closed position. During operation of the gripper head of the present invention, the air flow to valves 11 and 13 is terminated prior to toggling fingers 18a and 20a so as to neutralize jaws 14 and 16. When neutralized, jaws 14 and 16 remain in a fixed position with no movement either toward or away from axis 24. Thus, jaws 14 and 16 are neutralized when pressurized air flows through valves 38 and 58 thereby allowing finger tips 18a and 20a to move independently of jaws 14 and 16. The reasons for this will become apparent when the operation of gripper 10 is explained below. Finger tips 18a and 20a to may be configured to grasp and release components of various sizes and geometric shapes. In a preferred embodiment, fingers 18 and 20 are driven by the two pairs of air inlet valves 36, 38 and 56, 58, as described above. However, gripper head 10 may be configured so as to utilize a single driver to drive fingers 18 and 20. Furthermore, fingers 18 and 20 may be driven by servo-type drivers, magnetic-type drivers and position-sensing drivers. Hydraulic drivers may also be utilized.

Figure 4:
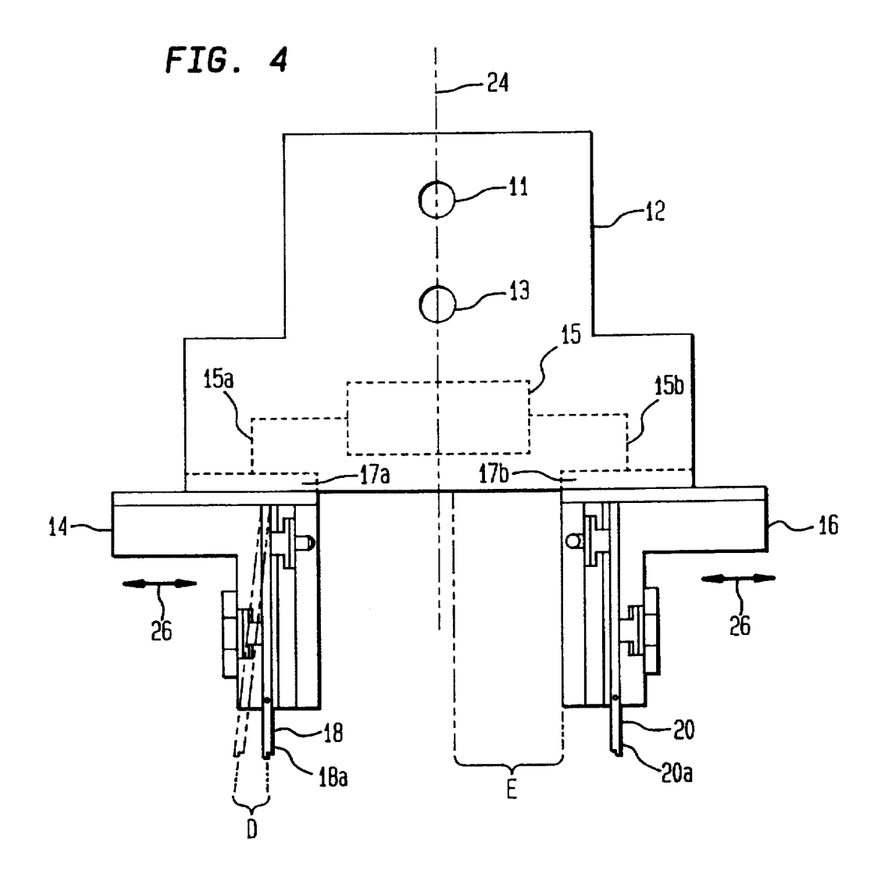
FIG. 4 depicts the range of motion of the gripper jaws and fingers of the gripper head of FIG. 1.

Referring to FIG. 4, the distance each jaw may move is designated by the letter E which, in a preferred embodiment, is between about 0.5 inches and 2.0 inches, inclusive. However, the distance E may be varied depending on the application, i.e., the size of the component to be retrieved or grasped. Therefore E may be greater than 2.0 inches. The distance D is the distance finger tips 18a and 20a may move. Preferably, D is between about 0.003 inch and 0.010 inch. More preferably, D is about 0.005 inch. However, it has been found that a minimum distance D of about 0.003 inch is sufficient to release a typical integrated circuit chip. The ratio of the distance each jaw may move to the distance each finger may move is expressed as E/D and is at least 10/1. Preferably, the ratio E/D is at least 100/1. Even more preferably, the ratio E/D is at least 500/1.

Figure 5:
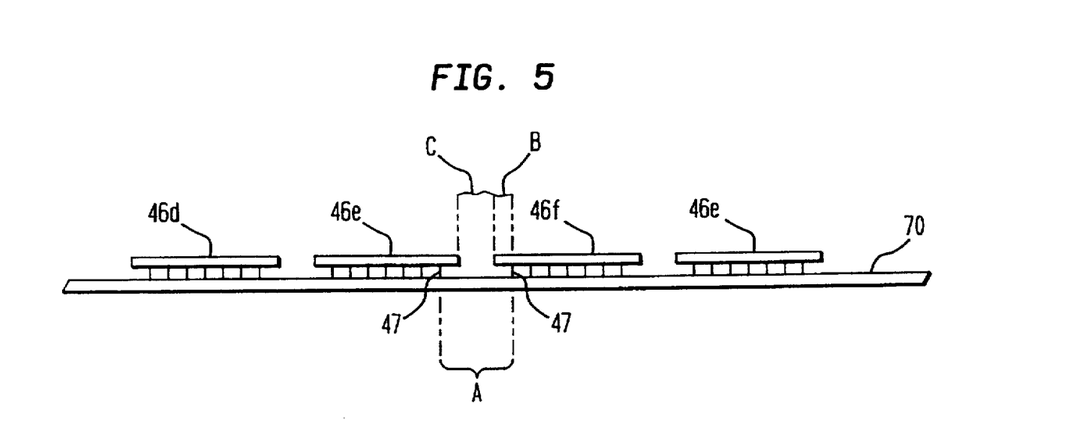
FIG. 5 depicts the spacing between components on a printed circuit board or card.

Referring to FIG. 5, the letter A represents the distance between pins 47 of components 46e and 46f. Typically, this distance is about 0.040 inch, 0.050 inch or 0.100 inch. The letter B represents the distance that the body of component 46f extends beyond pin 47. When A is 0.040 inch or 0.050 inch, B is typically 0.010 inch. When A is 0.100 inch, B is typically 0.025 inch. The distance indicated by the letter C is the actual distance or clearance between component 46e and 46f and is determined by the formula C=A−2B. Thus, if A is about 0.040 inch and B is about 0.010 inch, then C is 0.020 inch. Therefore, finger tips 18a and 20a have a clearance or "working space" of 0.020 inch within which to maneuver in order to release a component without contacting or interfering with adjacent components. As stated previously above, D is preferably about 0.005 inch. Therefore, for this particular example, each finger tip 18a and 20a utilizes only about 25% of clearance C.

Operation

Figure 2:
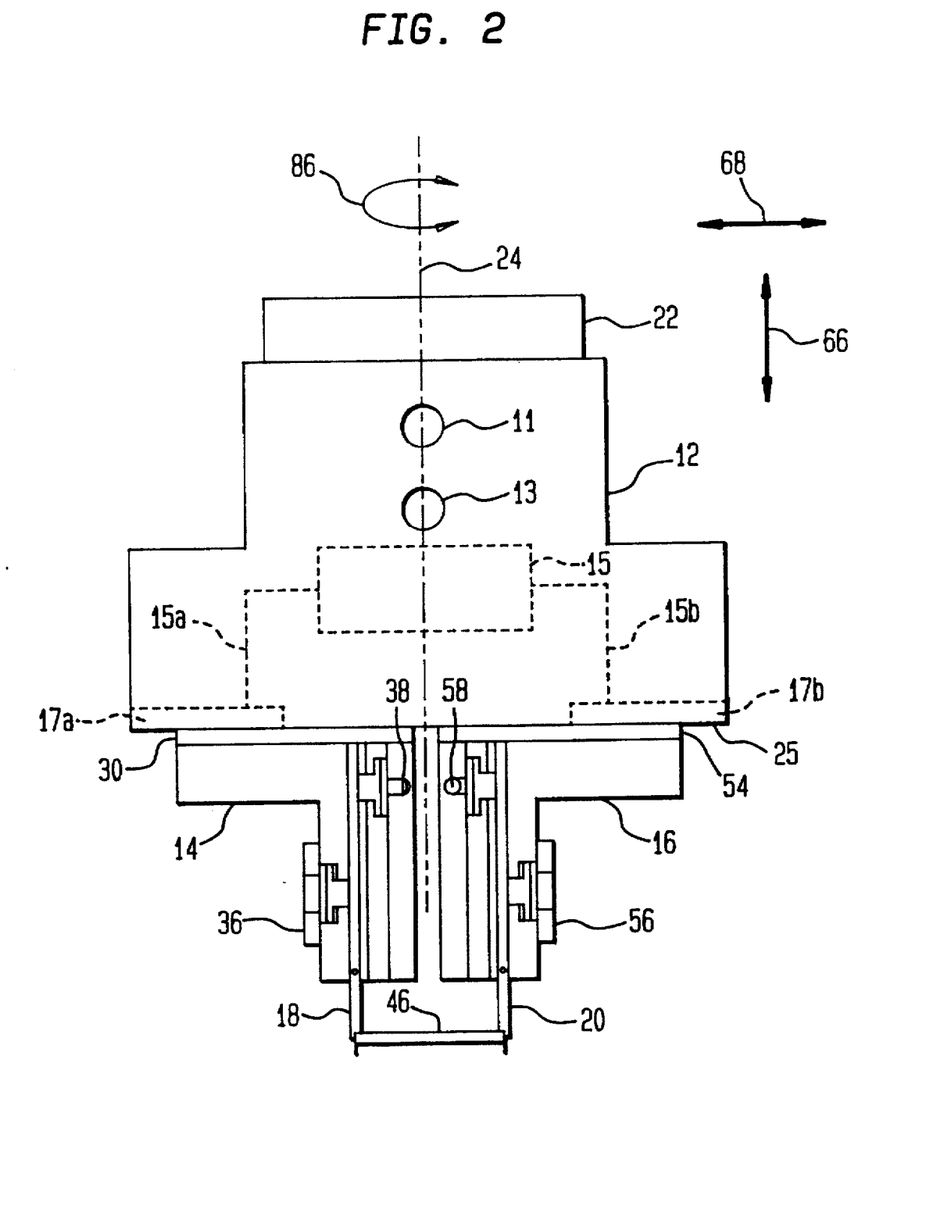
FIG. 2 shows the gripper head of FIG. 1 wherein the gripper jaws are in the closed position and the gripper fingers are in the closed position so as to grasp a component.

FIG. 1 shows gripper 10 with jaws 14 and 16 in an open position and finger tips 18a and 20a in a closed position and set to grasp component 46. At this point, component 46 is to be inserted into circuit board or card 70 (see FIG. 3). Referring to FIGS. 1 and 2, the robot or other automated or computer controlled mechanism vertically, horizontally and rotationally maneuvers gripper 10, as indicated by arrows 66, 68 and 86, respectively, to position finger tips 18a and 20a around component 46. Jaws 14 and 16 are then closed so chamfered portions 18b and 20b of finger tips 18a and 20a, respectively, grasp the perimetrical edge of component 46. Referring to FIG. 3, the robot then vertically and horizontally maneuvers gripper 10 to a predetermined location over circuit board 70. The robot then lowers gripper 10 so that component 46 will be inserted into a predetermined location, e.g. between components 46a and 46b. Once component 46 is positioned at its predetermined location, jaws 14 and 16 are neutralized and become stationary. Air inlet valves 36 and 56 then receive pressurized air to toggle finger tips 18a, 20a so as to open finger tips 18a and 20a to release component 46. Due to the limited range of motion of finger tips 18a and 20a, which is preferably between about 0.003 inch and 0.006 inch, finger tips 18a and 20a are able to operate within spaces 72 and 74 without contacting or interfering with adjacent components 46a and 46b. The robot then raises gripper 10 prior to any movement of jaws 14 and 16 in order to prevent finger tips 18a and 20a from interfering or damaging adjacent components 46a and 46b. Once gripper 10 is positioned at the desired location, jaws 14 and 16 are then opened via pressurized air entering valve 11. Pressurized air is then sent to air input valves 38 and 58 to close fingers 18a and 20a. Gripper 10 is now in its reset position with jaws 14 and 16 in the open position and finger tips 18a and 20a in the closed position. Gripper 10 is now ready to grasp another component that is to be inserted into circuit card or board 70.

Thus, gripper 10 of the present invention attains the aforementioned objects. Specifically, gripper 10:

a) is lightweight;

b) provides fingers 18a and 20a which can move independently of jaws 14 and 16, respectively, while jaws 14 and 16 are neutralized thereby enabling fingers 18a and 20a to maneuver within the tight or minimal space between components;

c) can position or retrieve electronic components on or from, respectively, high density printed circuit boards or cards without interfering with adjacent components;

d) is adaptable to handle components having various sizes and geometric shapes;

e) may be configured to operate in a manner which is opposite to that described above. In such a configuration, fingers 18 and 20 exhibit a range of motion which is significantly larger than the range of motion of the jaws, and fingers 18 and 20 are neutralized while jaws 14 and 16 are opened to release the component; and f) may be operated with components having pockets or openings formed therein. For such components, the fingers would open to grasp the edges of the component opening or pocket and close to release its grip on the edges thereby releasing the component.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A gripping apparatus, comprising:

a body having a central axis and a fastener for attaching said body to an automated manufacturing device;

a pair of jaws movably attached to said body, each jaw projecting away from said body;

the jaw driver bidirectionally moving each jaw toward and away from the a jaw driver operatively attached to said body for opening and closing said jaws, central axis, the movement of each jaw defining one range of motion;

a pair of fingers, each of which extending from and movably attached to a corresponding jaw; and a finger driver for opening and closing said fingers independently of said jaws, the finger driver bidirectionally moving the fingers substantially parallel to the bidirectional movement of the jaws the movement of each finger defining another range of motion, one of said ranges of motion being significantly smaller than the other range of motion.

2. The apparatus of claim 1 wherein the movement of each jaw and of each finger defines a first and a second range of motion, respectively, said first range of motion being significantly larger than said second range of motion.

3. The apparatus of claim 2 wherein said first range of motion has a lower limit of about 0.5 inch and an upper limit of at least 2.0 inches.

4. The apparatus of claim 2 wherein said second range of motion is between about 0.003 inch and 0.010 inch, inclusive.

5. The apparatus of claim 1 wherein the movement of each jaw and of each finger defines a first and a second range of motion, respectively, said first range of motion being significantly smaller that said second range of motion.

6. The apparatus of claim 1 wherein each of said jaws defines a chamber therein, each of said fingers being movably disposed within a corresponding jaw chamber.

7. The apparatus of claim 6 wherein said finger driver comprises a second pair of drivers.

8. The apparatus of claim 7 wherein said second pair of drivers are pneumatic.

9. The apparatus of claim 8 wherein each of said second pair of drivers comprises a pair of inlet valves mounted to a corresponding jaw and in communication with the chamber in said jaw.

10. The apparatus of claim 9 including a pressurized air source in communication with said pair of air inlet valves of each of said second pair of drivers.

11. The apparatus of claim 10 including a control system connected to control the flow of pressurized air from said pressurized air source to said pair of air inlet valves of each of said second pair of drivers.

12. The apparatus of claim 1 wherein said body has a top portion and a bottom portion, said fastener being attached to said top portion, said jaws being slidably attached to said bottom portion of said body.

13. The apparatus of claim 1 wherein said jaw driver is disposed within said body.

14. The apparatus of claim 13 wherein said jaw driver comprises a first pair of drivers, each of which driving a corresponding jaw.

15. The apparatus of claim 13 wherein said jaw driver is of a type chosen from pneumatic, servo, electromagnetic and hydraulic.

16. The apparatus of claim 15 further including a pair of air inlet valves on said body in communication with said jaw driver.

17. The apparatus of claim 16 further including a pressurized air source in communication with said pair of air inlet valves.

18. The apparatus of claim 17 further including a control system connected to control the flow of pressurized air from said pressurized air source to said air inlet valves.

19. A gripper head for retrieving components and placing them in predetermined positions, comprising:
- a body having a top portion, a bottom portion and a fastener attached to said top portion for attaching said body to an automated device, said body having a vertically oriented central axis;
- a pair of jaws slidably attached to said bottom portion of said body, one positioned on each side of said central axis, each jaw projecting away from said body and defining a chamber, the axis of each jaw being substantially parallel to said central axis;
- a first pair of drivers disposed within said body for bidirectionally driving a corresponding jaw toward and away from said central axis, the bidirectional movement of each jaw defining a first range of motion;
- a pair of fingers, each of which being partially and movably disposed within a corresponding chamber; and
- a second pair of drivers, each of which being operatively attached to a corresponding one of said jaws for bidirectionally driving a corresponding finger toward and away from said central axis, the bidirectional movement of each finger defining a second range of motion significantly smaller than said first range of motion and being independent of the bidirectional movement of said jaws.

20. The gripper head of claim 19 wherein said first range of motion has a lower limit of about 0.5 inch and an upper limit of at least 2.0 inches.

21. The gripper head of claim 19 wherein said second range of motion is between about 0.003 inch and 0.010 inch, inclusive.

22. The gripper head of claim 19 wherein each of said first and second pair of drivers is pneumatic.

23. The apparatus of claim 22 further including:
- a pressurized air source for supplying pressurized air to said first and second pair of drivers; and
- a control system connected to control said first and second pair of drivers, said control system terminating the pressurized air flow to said first pair of drivers while allowing pressurized air flow to said second pair of drivers.

24. A gripper head for retrieving components and placing them in predetermined positions, comprising:
- a body having a top portion, a bottom portion and a fastener attached to said top portion for attaching said body to an automated device, said body having a vertically oriented central axis;
- a pair of jaws slidably attached to said bottom portion of said body, one positioned on each side of said central axis, each jaw projecting away from said body and defining a chamber, the axis of each jaw being substantially parallel to said central axis;
- a first pair of drivers disposed within said body for bidirectionally driving a corresponding jaw toward and away from said central axis, the bidirectional movement of each jaw defining a first range of motion;
- a pair of fingers, each of which being partially and movably disposed within a corresponding chamber; and
- a second pair of drivers, each of which being operatively attached to a corresponding one of said jaws for bidirectionally driving a corresponding finger toward and away from said central axis, the bidirectional movement of each finger defining a second range of motion significantly larger than said first range of motion, the bidirectional movement of said jaws being independent of the bidirectional movement of said fingers.

25. The gripper head of claim 24 wherein said second range of motion has a lower limit of about 0.5 inch and an upper limit of at least 2.0 inches.

26. The gripper head of claim 24 wherein said first range of motion is between about 0.003 inch and 0.010 inch, inclusive.

27. The gripper head of claim 24 wherein each of said first and second pair of drivers is pneumatic.

28. The apparatus of claim 27 further including:
- a pressurized air source for supplying pressurized air to said first and second pair of drivers; and
- a control system connected to control the flow of pressurized air from said pressurized air source to said first and second pair of drivers, said control system terminating the pressurized air flow to said second pair of drivers while allowing pressurized air flow to said first pair of drivers.

29. A method for retrieving components and placing them at a predetermined location without interfering with adjacent components, comprising the steps of:

(a) providing a gripping apparatus, said apparatus comprising a body having a fastener for attaching said body to a robotic controller, a pair of jaws slidably attached to said body and projecting away from said body, a jaw driver operatively attached to said body for opening and closing said jaws, the movement of each jaw defining a first range of motion, a pair of fingers, each of which extending from and movably attached to a corresponding jaw, and a finger driver connected to open and close said fingers, the bidirectional movement of each finger defining a second range of motion significantly smaller than said first range of motion, the movement of said fingers being independent from the movement of said jaws;

(b) opening said jaws;

(c) closing said fingers;

(d) positioning said gripping apparatus so that a component to be retrieved is between said fingers;

(e) closing said jaws so said fingers grip the component;

(f) positioning said gripping apparatus so that the component is at the predetermined location;

(g) neutralizing said jaws; and (h) opening said fingers to release the grip on the component.

30. The method of claim 29 wherein step (f) further includes the steps of positioning said gripping apparatus such that each finger penetrates the space between the retrieved component and adjacent components.

31. The method of claim 29 wherein said first range of motion has a lower limit of about 0.5 inch and an upper limit of at least 2.0 inches.

32. The method of claim 29 wherein said second range of motion is between about 0.003 inch and 0.010 inch, inclusive.

33. A method for retrieving components and placing them at a predetermined location without interfering with adjacent components, comprising the steps of:

(a) providing a gripping apparatus, said apparatus comprising a body having a fastener for attaching said body to a robotic controller, a pair of jaws slidably attached to said body and projecting away from said body, a jaw driver operatively attached to said body for opening and closing said jaws, the movement of each jaw defining a first range of motion, a pair of fingers, each of which extending from and movably attached to a corresponding jaw, and a finger driver connected to open and close said fingers, the bidirectional movement of each finger defining a second range of motion significantly larger than said first range of motion, the movement of said jaws being independent from the movement of said fingers;

(b) closing said jaws;

(c) opening said fingers;

(d) positioning said gripping apparatus so that a component to be retrieved is between said fingers;

(e) closing said fingers to grip the component;

(f) positioning said gripping apparatus so that the component is at the predetermined location;

(g) neutralizing said fingers; and (h) opening said jaws to release the grip on the component.

34. The method of claim 33 wherein step (f) further includes the steps of positioning said gripping apparatus such that each finger penetrates the space between the retrieved component and adjacent components.

35. The method of claim 33 wherein said second range of motion has a lower limit of about 0.5 inch and an upper limit of at least 2.0 inches.

36. The method of claim 33 wherein said first range of motion is between about 0.003 inch and 0.010 inch, inclusive.

* * * * *

UNITED STATES PATENT AND TRADEMARK OFFICE
CERTIFICATE OF CORRECTION

PATENT NO. : 5,562,320
DATED : October 8, 1996
INVENTOR(S) : Bloomberg et al.

It is certified that error appears in the above-identified patent and that said Letters Patent is hereby corrected as shown below:

Column 8,
In claim 1, lines 11 - 15
please delete the text as shown therein and insert:

--a jaw driver operatively attached to said body for opening and closing said jaws, the jaw driver bidirectionally moving each jaw toward and away from the central axis, the movement of each jaw defining one range of motion; --

Signed and Sealed this

Tenth Day of December, 1996

Attest:

Attesting Officer

BRUCE LEHMAN

Commissioner of Patents and Trademarks